Dec. 23, 1969  W. WOLTCHE  3,485,549
HIGH-SPEED PHOTOGRAPHIC OR CINEMATOGRAPHIC
GAUSSIAN DUAL OBJECTIVE
Filed Feb. 20, 1967
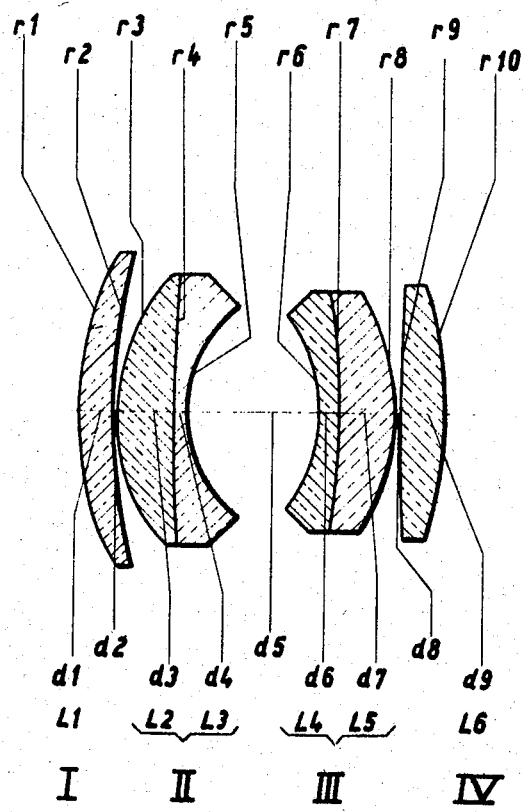
Inventor:
WALTER WÖLTCHE
Karl J. Ross
Attorney

United States Patent Office 3,485,549
Patented Dec. 23, 1969

3,485,549
HIGH-SPEED PHOTOGRAPHIC OR CINEMATO-GRAPHIC GAUSSIAN DUAL OBJECTIVE
Walter Woltche, Bad Kreuznach, Germany, assignor to Jos. Schneider & Co., Bad Kreuznach, Germany, a corporation of Germany
Filed Feb. 20, 1967, Ser. No. 617,326
Claims priority, application Germany, Feb. 24, 1966, Sch 38,550
Int. Cl. G02b 1/00, 9/36
U.S. Cl. 350—176                    1 Claim

ABSTRACT OF THE DISCLOSURE

Optical objective with two collective outer lens members and two dispersive meniscus-shaped inner lens members defining a diaphragm space by their concave surfaces, each dispersive lens member being in the form of a doublet with a cemented surface turning its concave side toward the diaphragm space, the cemented surface of the object-side doublet being negatively refracting while the cemented surface of the image-side doublet is positive refracting.

---

My present invention relates to an optical objective for photographic or cinematographic cameras, more specifically a Gaussian duel objective of the general type described in commonly assigned U.S. Patents Nos. 2,796,002, 2,824,493, 2,824,494 and 2,831,396 to G. Klemt. Such objectives consist of four air-spaced lens members, i.e. a pair of collective outer members and a pair of dispersive inner members in the form of negative menisci defining a diaphragm space by their concave surfaces, each meniscus being designed as a doublet.

A conventional Gaussian dual objective disclosed in the aforementioned Klemt patents has an aperture ratio of 1:2 and an image distance or back-focal length slightly greater than 72% of the overall focal length thereof. Its diaphragm space, on the other hand, amounts to only a little more than one-fifth of the overall focal length, which is inconvenient for some camera designs.

The general object of my present invention, therefore, is to provide an improved objective of the character set forth above which, with substantially the same relative aperture and back-focal length, has an enlarged diaphragm space equaling approximately one-fourth of the overall focal length.

This objective is realized, in an otherwise conventional Gaussian objective, by a modification of the image-side doublet in such a manner that its cemented surface, which in the known system has been convex toward the diaphragm space, turns its concavity toward that space while still retaining its positive refractivity in contradistinction to the negative refractivity of the substantially symmetrically curved cemented surface of the object-side doublet. For this purpose, the image-side doublet is composed of a concavo-convex negative lens adjoining the diaphragm space and a concavo-convex positive lens facing the rear collective lens member, the negative lens having a higher refractive index than the positive lens. Furthermore, the refracting indices $n_e$ of all lenses except those constituting the object-side doublet, for a spectral wavelength of $\lambda=3.50$ m$\mu$, should be greater than 1.75.

The sole figure of the accompanying drawing shows a representative embodiment of the invention.

The Gaussian objective shown in the drawing comprises a collective front member I in the form of a meniscus-shaped singlet L1 with a convex forward surface of radius $r1$, thickness $d1$ and a concave rear surface of radius $r2$; a first dispersive doublet II separated from member I by a first air space $d2$ and consisting of a positive meniscus L2 (radii $r3$, $r4$ and thickness $d3$) cemented onto a negative meniscus L3 (radii $r4$ and $r5$ and thickness $d4$) whose concave rear surface confronts a diaphragm space $d5$; a generally similar but oppositely oriented doublet III consisting of a negative meniscus L4 (radii $r6$, $r7$ and thickness $d6$) cemented onto a positive meniscus L5 (radii $r7$, $r8$ and thickness $d7$); and a rear member IV in the form of a biconvex singlet L6 which is separated from doublet III by a small air space $d8$ and whose forward radius $r9$ is considerably greater than its rear radius $r10$, its thickness being designated $d9$.

Representative numerical values for the parameters of the illustrated objective are given in the following Table, based upon an overall focal length $f$ of 100 linear units (e.g. mm.); the refractive indices $n_e$ and the Abbé numbers $\nu$ are for the e-line of the spectrum having a wavelength $\lambda=546.1$ m$\mu$. This system has a relative aperture of 1:2 and a back-focal length of 71.9 units. The Table also shows the refractive power $\Delta n/r$ of each lens surface, in absolute terms, with the overall power given by $1/f=0.01$.

TABLE

| Lens | | Radii | Thicknesses and Separations | $n_e$ | $\nu$ | $\Delta n/r$ |
|---|---|---|---|---|---|---|
| I | L1 | $r1=+63.05$ | $d1=6.13$ | 1.78868 | 43.62 | +0.01251 |
|  |  | $r2=+121.37$ | $d2=0.38$ |  |  | −0.00650 |
| II | L2 | $r3=+37.88$ | $d3=10.73$ | 1.68081 | 55.31 | +0.01797 |
|  |  | $r4=+575.52$ |  |  |  | −0.00014 |
|  | L3 |  | $d4=2.30$ | 1.59910 | 38.98 |  |
|  |  | $r5=+25.52$ | $d5=24.91$ | diaphragm space | | −0.02348 |
| III | L4 | $r6=-30.88$ | $d6=3.83$ | 1.81262 | 25.28 | −0.02632 |
|  |  | $r7=-134.40$ |  |  |  | +0.00018 |
|  | L5 |  | $d7=10.35$ | 1.78868 | 43.62 |  |
|  |  | $r8=-41.25$ | $d8=0.38$ |  |  | +0.01912 |
| IV | L6 | $r9=+864.04$ | $d9=7.28$ | 1.78868 | 43.62 | +0.00091 |
|  |  | $r10=-82.71$ |  |  |  | +0.00954 |

The numerical values of the foregoing Table are to be understood as valid within tolerance limits of substantially ±10% for the radii $r1$ to $r10$, the thicknesses and separations $d1$ to $d9$, the surface powers $\Delta n/r$ and the Abbé numbers $\nu$, and of substantially ±0.02 for the refractive indices $n_e$.

I claim:
1. An optical objective of the Gaussian type, consisting of four air-spaced lens members including a collective first lens member on the object side, a dispersive second member following said first member, a dispersive third member following said second member and a collective fourth member following said third member; said second and third members being meniscus-shaped doublets with confronting concave surfaces defining a diaphragm space between them, each of said doublets consisting of a negative meniscus adjoining said diaphragm space and a positive meniscus remote from said diaphragm space; the numerical values of the radii $r1$ to $r10$ and the thicknesses and separations $d1$ to $d9$ of said first member L1, the positive meniscus L2 of said second member, the negative meniscus L3 of said second member, the negative meniscus L4 of said third member, the positive meniscus L5 of said third member, and said fourth member L6, based upon an overall focal length of numerical value 100, their refractive indices $n_e$ and their

Abbé numbers, for a wavelength $\lambda = 546.1\ m\mu$, being substantially as given in the following table:

TABLE

| | Lens | Radii | Thicknesses and Separations | $n_e$ | $\nu$ | $\Delta n/r$ |
|---|---|---|---|---|---|---|
| I | L1 | r1 = +63.05 | d1 = 6.13 | 1.78868 | 43.62 | +0.01251 |
| | | r2 = +121.37 | d2 = .38 | | | −0.00650 |
| II | L2 | r3 = +37.88 | d3 = 10.73 | 1.68081 | 55.31 | +0.01797 |
| | | r4 = +575.52 | d4 = 2.30 | 1.59910 | 38.98 | −0.00014 |
| | L3 | r5 = +25.52 | d5 = 24.91 | diaphragm space | | −0.02348 |
| III | L4 | r6 = −30.88 | d6 = 3.83 | 1.81262 | 25.28 | −0.02632 |
| | L5 | r7 = −134.40 | d7 = 10.35 | 1.78868 | 43.62 | +0.00018 |
| | | r8 = −41.25 | d8 = 0.38 | | | +0.01912 |
| IV | L6 | r9 = +864.04 | d9 = 7.28 | 1.78868 | 43.62 | +0.00091 |
| | | r10 = −82.71 | | | | +0.00954 |

References Cited

UNITED STATES PATENTS

| | | | |
|---|---|---|---|
| 2,398,276 | 4/1946 | Altman | 350—221 |
| 2,416,032 | 2/1947 | Warmisham et al. | 350—222 |
| 2,682,198 | 6/1954 | Aklin | 350—222 |
| 2,983,193 | 5/1961 | Schade | 350—222 |

FOREIGN PATENTS 3,811,585   7/1963   Japan.

DAVID SCHONBERG, Primary Examiner

RONALD J. STERN, Assistant Examiner

U.S. Cl. X.R.

350—222